United States Patent [19]

Nimura et al.

[11] Patent Number: 5,762,983
[45] Date of Patent: Jun. 9, 1998

[54] MOLD FOR AIR BAG COVER

[75] Inventors: Soji Nimura, Nagoya; Ryoji Kagohashi, Konan; Shinichi Goto, Nagoya, all of Japan

[73] Assignee: Toyoda Gosei Co., Ltd., Aichi-ken, Japan

[21] Appl. No.: 758,635

[22] Filed: Nov. 27, 1996

[30] Foreign Application Priority Data

Nov. 27, 1995  [JP]  Japan .................. 7-307573

[51] Int. Cl.$^6$ .................................. B29C 45/40
[52] U.S. Cl. .................. 425/556; 425/444; 425/577
[58] Field of Search .................. 425/556, 444, 425/443, 577

[56] References Cited

U.S. PATENT DOCUMENTS

| | | | |
|---|---|---|---|
| 3,585,690 | 6/1971 | Tucker | 425/577 |
| 3,940,103 | 2/1976 | Hilaire | 425/443 |
| 3,982,875 | 9/1976 | Abey | 425/444 |
| 5,183,615 | 2/1993 | Zushi | 425/556 |
| 5,240,719 | 8/1993 | Hedgewick | 425/556 |
| 5,603,968 | 2/1997 | Tajiri et al. | 425/556 |

FOREIGN PATENT DOCUMENTS

| | | | |
|---|---|---|---|
| 62-255109 | 11/1987 | Japan | 425/444 |
| 3-16557 | 2/1991 | Japan . | |
| 3-18217 | 4/1991 | Japan | 264/328.7 |
| 5-77278 | 3/1993 | Japan | 264/255 |
| 7-125008 | 5/1995 | Japan . | |
| 1417152 | 12/1975 | United Kingdom | 425/444 |

OTHER PUBLICATIONS

Derwent abstract #N95-166516 of Japanese Kokai 7-125009, May 1995.

*Primary Examiner*—Robert Davis
*Attorney, Agent, or Firm*—Cushman Darby & Cushman, IP Group of Pillsbury Madison & Sutro LLP

[57] ABSTRACT

This invention relates a mold for molding an air bag cover having an upper wall and a rectangular side wall extended from the back surface of the upper wall. The mold comprises first and second split molds, with the second split mold including a main body, an inner core and pushing pins. The inner core forms the inner surface of the side wall. When the mold opens, the inner core is pulled out from the main body before the pushing pins move.

19 Claims, 3 Drawing Sheets

MOLD FOR AIR BAG COVER

The following priority application, Japanese Patent Application No. hei 7-307573, filed in Japan on Nov. 27, 1995, is hereby incorporated by reference into the present specification.

BACKGROUND OF THE INVENTION

1. Field of the Invention

This invention relates to a mold, and more particularly to a mold for molding air bag covers.

2. Description of Related Art

A conventional air bag cover covers a folded bag and comprises an upper wall having a tear line and side walls a shown in Japanese Utility Model laid open No. hei 3-16557. The side walls are formed with a rectangular box shape to thereby cover the sides of the folded bag.

A mold for molding the conventional air bag cover comprises a first split mold for molding a top face of the upper wall and a second split mold for molding the rear surface of the upper wall and the side walls. The second split mold has a lot of pushing pins for demolding purposes.

However, when the air bag cover is taken off the mold, the upper wall of the air bag cover may be deformed and the side wall may be broken because of the pushing that occurs on the upper wall by the pushing pins.

Therefore, the second split mold can have an extrusion block for extruding a molded air bag cover from the second split mold instead of using the pushing pins as shown in Japanese Patent laid open No. hei 7-125008. The extrusion block is arranged at a position for molding an end and an inner peripheral surface of the side wall and a part of an interior of the upper wall.

The extrusion block prevents the side walls from breaking, because the extrusion block pushes up the air bag cover while contacting the end and the inner peripheral surfaces of the side walls and part of the interior of the upper wall. The extrusion block also prevents the upper wall from deforming because the extrusion block has a bigger surface than the pins one.

However, the extrusion block of the conventional mold is located at the inner side of the side wall. Because the side wall shrinks after molding it tends to grip the block with increased force. Consequently, when the air bag cover is taken off the extrusion block, a certain amount of force is needed. High air pressure can be used, automatically, to remove the air bag cover by blowing air toward the rear surface of the case. When a robot automatically grips and removes the air bag cover from the extrusion block, quick removal of the air bag cover from the extrusion block is difficult because a careful approach is still required in order to not damage the cover material.

SUMMARY OF THE INVENTION

An object of the present invention is to provide a mold for the air bag cover which is prevented from deforming and breaking and is easily taken off the mold.

A mold for molding an air bag cover comprises a first split mold for molding a front surface of an upper wall and a second split mold for molding a back surface of the upper wall and the side walls. The second split mold includes a main body, an inner core and a plurality of pushing pins. The pushing pins contact the rear surface of the upper wall and push the air bag cover from the main body when the mold opens. The inner core forms an inner surface of the side walls and is pulled out from the main body before the pushing pins move.

When the mold opens, such as parting the first split mold from the second split mold, first, an inner core is drawn out. The inner core rubs and moves on the inner surface of the side wall. Even if the side walls produce an inwardly directed shrinkage force, the inner core can be smoothly removed from the inner surface of the side walls because a bottom end of each of the side walls is held and supported by the main body of the second split mold as the inner core moves outwardly from that support point.

Then the pushing pins are pushed out from the second split mold together with the molded air bag cover. The upper wall and the side wall is removed from the second split mold main body. At this time, the outer surface of the side wall can smoothly be removed from the second split mold because the inner side of the side walls have already been formed about the space in which the inner core has been pulled out from the air bag cover.

After the pushing pins are pushed out from the second split mold along with the molded air bag cover, the molded air bag cover is then a condition that makes it easy to be removed from the push rods. The molded air bag cover is supported by the pushing pins only and is quickly and easily removed by the blowing of low pressure air against the cover or the cover can be automatically gripped by a machine.

Therefore, the molded air bag cover can be removed from the mold made according to this invention without breaking the upper wall or the side wall. The molded air bag can also be quickly and easily removed from the mold automatically.

Other objects, features, and characteristics of the invention will become apparent upon consideration of the following description and the appended claims with reference to the accompany drawings, all of which form a part of this specification.

DETAILED DESCRIPTION OF THE PREFERRED EMBODIMENT

Figure 1:
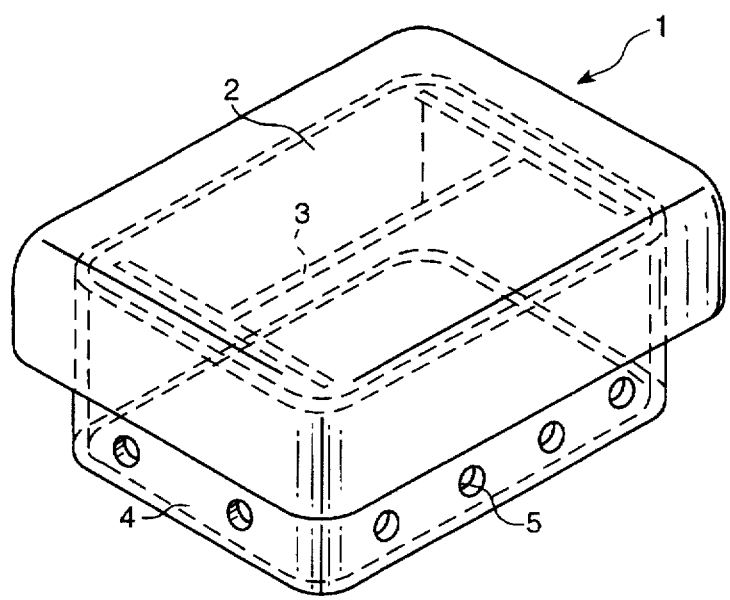
FIG. 1 is a perspective view showing an air bag cover.
Figure 2:
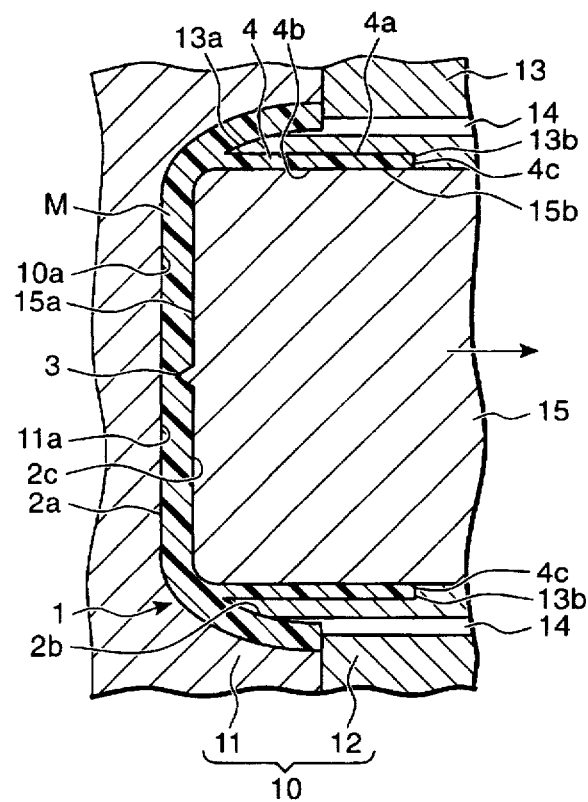
FIG. 2 is a sectional view showing a mold of this first embodiment for molding the air bag cover.

A mold 10 in FIG. 2 molds an air bag cover 1 in FIG. 1 by an injection molding process and comprises a first split mold 11 and a second split mold 12.

As shown in FIG. 1, the air bag cover 1 is made of thermoplastic elastomer or soft vinyl chloride resin and comprises an upper wall 2 and a continuous, rectangular side wall 4 which extends outwardly from a back side of the upper wall 2 and circumferentially about four sides of the cover. The upper wall 2 has a tearing line 3 that opens easily when an air bag, held thereunder, is deployed. The tearing line 3 is formed with a conventional groove on the back side of the upper wall 2 and also is defined with an H-letter shape. Installation holes 5 are located at spaced apart positions on the side wall 4 and are bored or otherwise formed after the air bag cover 1 is taken off mold 10.

The first split mold 11 is attached to a fixed side surface plate of the injection molding machine and has a mold surface 11a which molds the front or outer surface 2a of the upper wall 2.

The second split mold 12 is attached to a movable side surface plate of the injection molding machine and comprises a main body 13, four pushing pins 14 and an inner core 15. The second split mold 12 molds a back surface 2b, 2c of the upper wall 2 and the side wall 4.

The inner core 15 has an upper mold surface 15a molding the back surface 2c and a side mold surfaces 15b molding the inner surfaces 4b of the side wall 4. When the mold 10 opens, the inner core 15 moves and pulls away from the main body 13 earlier than pushing occurs by the pushing pins 14.

Figure 5:
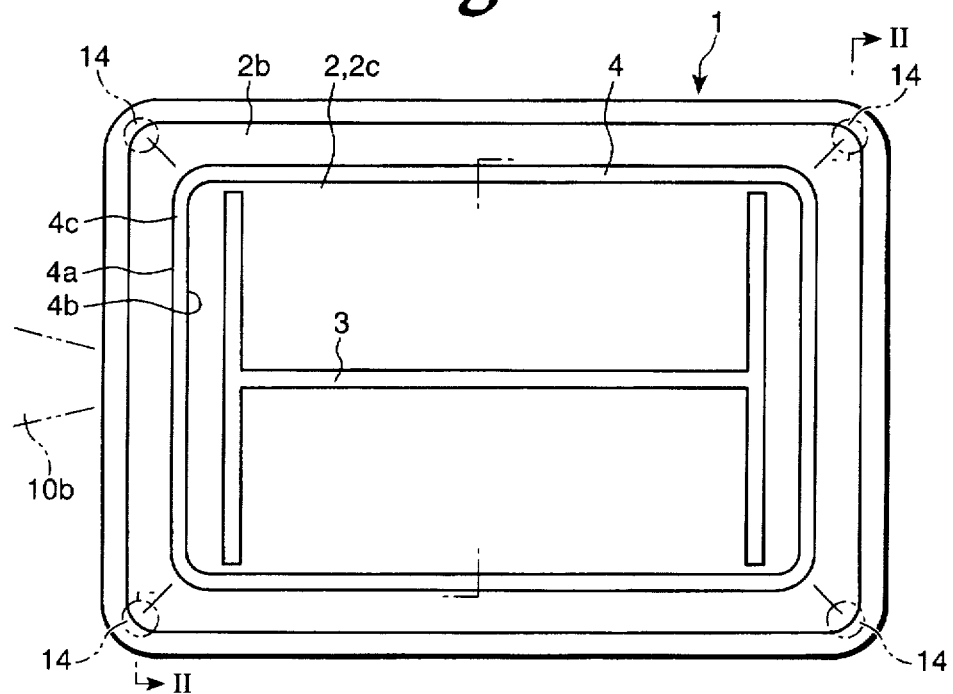
FIG. 5 is a back side view showing the air bag cover.

Each pushing pin 14 in FIGS. 2 and 5 is located at the corner of the upper wall 2. The tip of the pushing pin 14 touches a back surface 2c of the upper wall 2 around the side wall 4. When the mold 10 opens, pushing pins 14 can push off the molded air bag cover 1 in a direction parallel to the direction in which the mold opens.

The main body 13 has a molding surface 13a that molds the back surface 2b and 2c of the upper wall 2 and the side wall 4 except for molded by the pushing pins 14 and the inner core 15.

As shown in FIG. 5, a gate 10b, for injecting molding materials to a cavity 10a, is located at a side edge of the upper wall 2.

When the air bag cover 1 is molded by using the mold 10, first, molding material is injected into the cavity 10a of the closed mold 10 through the gate 10b. Then, the molded air bag cover 1 is cooled. At this point, the mold and cover are as shown in FIG. 2.

Figure 3:
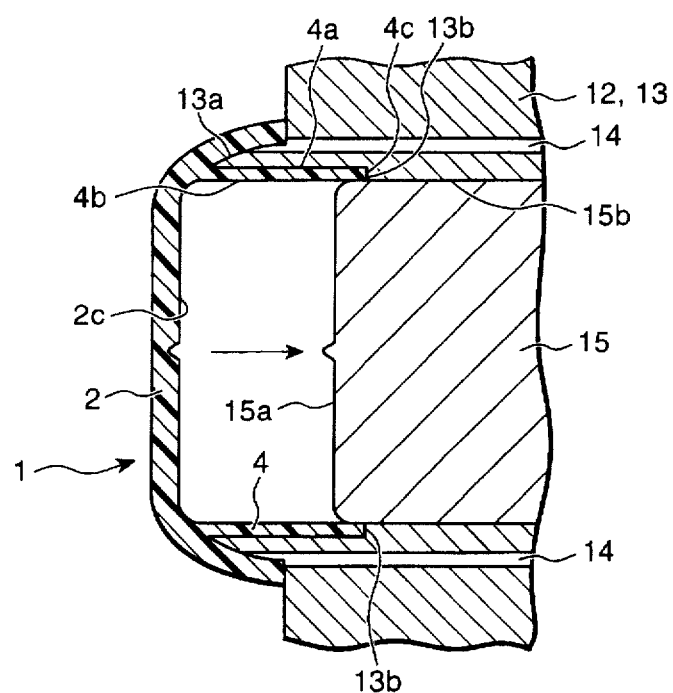
FIG. 3 is a sectional view showing the mold after moving an inner core.

Then as the mold 10 is opened, the first split mold 11 is removed from the second split mold 12. The inner core 15 is also pulled away from the second split mold 12 as in FIG. 3. The inner core 15 glides on an inner surface 4b of the molded side wall 4. Even if the side wall 4 adds a restricting force to the inner core 15, the inner core 15 is still smoothly taken off the inner surface of the side wall 4 because the edge 4c of the side wall 4 is supported by a step 13b of the mold surface 13a. Thus, the side wall 4 and the upper wall 2 are not deformed.

Then, when the pushing pins 14 move outwardly from the second split mold 12, the upper wall 2 and the side walls 4 are smoothly taken off the mold surface 13a. Because the inner core 15 has already been moved away, the outside surface 4a of the side walls 4 is only guided by the second split mold 12.

Figure 4:
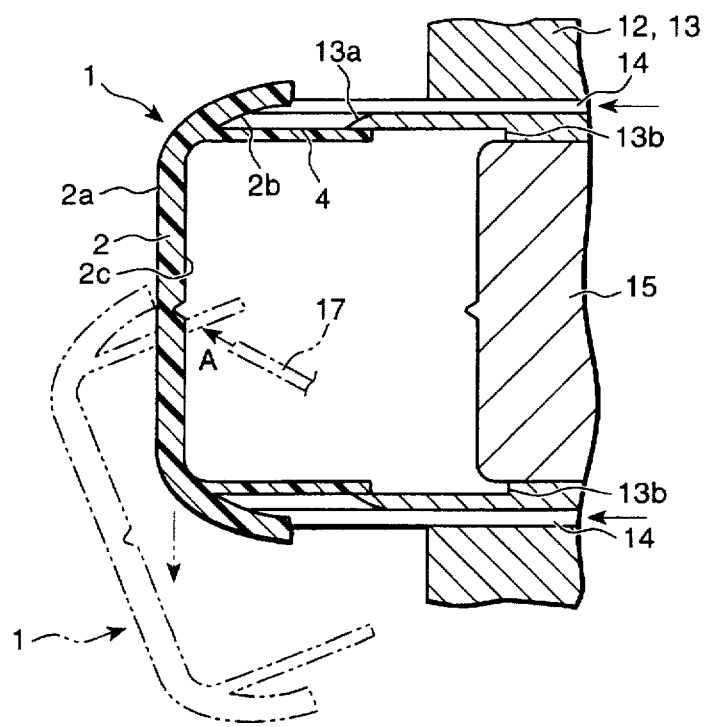
FIG. 4 is a sectional view showing the mold after moving pushing pins.

Finally, as shown in FIG. 4, an air nozzle 17 is automatically inserted behind the molded air bag cover 1 without interrupting the operation of pushing pins 14. When air is blown from air nozzle 17, the molded air bag cover 1 is urged off the pushing pins 14 and into a collection box (not shown in Figures) positioned under the mold 10. Even if the molded air bag cover 1 adds additional retraction force by itself, for example, because of shrinkages, it can easily be removed from the pushing pins 14 because the outer tip of the pushing pins 14 support or contact cover 1 with only the back surface 2b of the upper wall 2. Thus, the molded air bag cover 1 can easily be removed from the pins 14 without any damage by use of low pressure air.

Another way of removing a molded air bag, cover 1 from push pins 14 is to grip it robotically instead of using blowing air.

Figure 6:
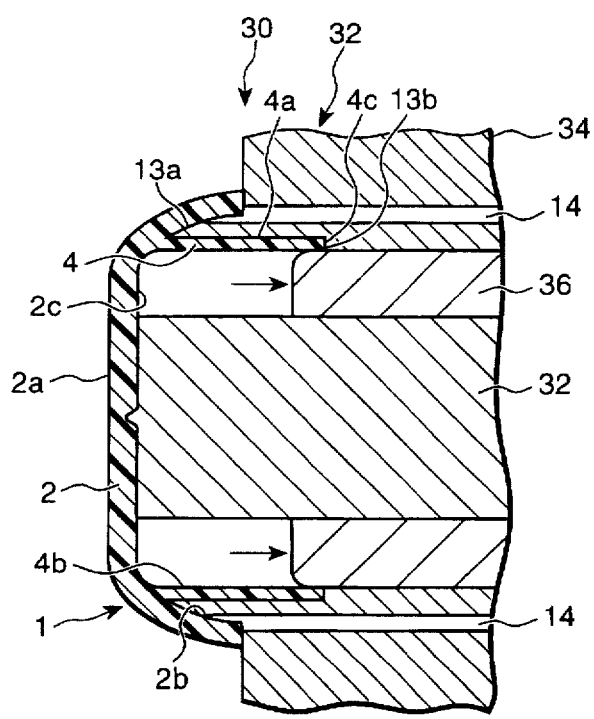
FIG. 6 is a sectional view showing a mold of another embodiment for the air bag cover.

In addition, a mold 30 of another embodiment is shown in FIG. 6. An inner core 36 is a rectangular shaped tube rather than a solid as is the inner core 15 of the first embodiment. The inner core 36 forms the inner side surface 4b of the side wall 4 and the part of the interior periphery of the upper wall 2 adjacent the side wall 4. The inner core 36 has the same effect and function as the inner core 15.

In addition, this invention can be used for another type of an air bag, cover having separated side walls instead of the continuous side walls 4 as shown in FIGS. 1 and 5. The separated side walls can also create inwardly directed shrinkage forces. Thus, when the mold for using, this invention is used to mold covers with separated side walls, the air bag, cover can still be easily taken off the mold without damage.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A mold for molding a cover having an upper wall and at least one side wall extending outwardly from said upper wall, said mold comprising:

a first split mold;

a second split mold having a main body, an inner core, a plurality of push pins spaced about said inner core and a mold extension provided between said main body and said inner core defining a space in which said at least one side wall is formed;

said first and second split molds being relatively movable in mold opening and closing directions;

said inner core being movable in a direction parallel to the mold opening direction; and wherein said push pins contact a portion of said upper wall to provide a pushing force in the mold opening direction.

2. A mold according to claim 1, wherein said first and second split molds when initially closed define a cavity therebetween.

3. A mold according to claim 1, wherein said push pins are located on opposite sides of side inner core.

4. A mold according to claim 1, wherein a total of four push pins are present.

5. A mold according to claim 4, wherein each push pin is located at a corner of the upper wall.

6. A mold according to claim 1, wherein said mold is used with injection molding equipment.

7. A mold according to claim 1, wherein the inner core moves away from said cover.

8. A mold according to claim 1, wherein said push pins and said inner core move in opposite yet parallel directions.

9. A mold according to claim 1, wherein said cover has separated side walls.

10. A mold according to claim 1, wherein said cover has continuous side walls.

11. A mold according to claim 1, wherein said first split mold forms a front surface of said upper wall and said second split mold forms a back surface of said upper wall and said at least one side wall.

12. A mold for molding a cover having an upper wall and at least one side wall extending outwardly from said upper wall, said mold comprising:

a first split mold;

a second split mold having a main body, an inner core, a plurality of push pins spaced about said inner core and a mold extension provided between said main body and said inner core defining a space in which said at least one side wall is formed;

said first and second split molds being relatively movable in mold opening and closing directions;

said inner core being movable in a direction parallel to the mold opening direction; and wherein said main body forms a bottom edge of said at least one side wall.

13. A mold according to claim 12, wherein said first split mold forms a front surface of said upper wall and said second split mold forms a back surface of said upper wall and said at least one side wall.

14. A mold according to claim 12, wherein said push pins and said inner core move in opposite yet parallel directions.

15. A mold according to claim 12, wherein said mold is used with injection molding equipment.

16. A mold for molding a cover having an upper wall and at least one side wall extending outwardly from said upper wall, said mold comprising:

a first split mold;

a second split mold having a main body, an inner core, a plurality of push pins spaced about said inner core and a mold extension provided between said main body and said inner core defining a space in which said at least one side wall is formed;

said first and second split molds being relatively movable in mold opening and closing directions;

said inner core being movable in a direction parallel to the mold opening direction; and wherein said inner core separates from said upper wall before said push pins move relative to said main body.

17. A mold according to claim 16, wherein said push pins and said inner core move in opposite yet parallel directions.

18. A mold according to claim 16, wherein said first split mold forms a front surface of said upper wall and said second split mold forms a back surface of said upper wall and said at least one side wall.

19. A mold according to claim 16, wherein said mold is used with injection molding equipment.

* * * * *